United States Patent [19]

Lamb et al.

[11] 3,753,677
[45] Aug. 21, 1973

[54] TETRACYANODITHIADIENE AND ITS SALTS AS BACTERICIDES AND ALGICIDES

[75] Inventors: Glentworth Lamb, Trenton, N.J.; Charles Frank Hinz, Stamford, Conn.

[73] Assignee: American Cyanamid Company, Stamford, Conn.

[22] Filed: Dec. 16, 1970

[21] Appl. No.: 98,958

[52] U.S. Cl..................................... 71/67, 424/277
[51] Int. Cl............................................... A01n 9/20
[58] Field of Search...................... 71/67; 424/277; 260/327

[56] References Cited
UNITED STATES PATENTS
3,400,134  9/1968  Simmons............................ 424/277
3,265,565  8/1966  Frazza et al. ....................... 424/277

Primary Examiner—Lewis Gotts
Assistant Examiner—Catherine L. Mills
Attorney—James H. Laughlin, Jr.

[57] ABSTRACT

A method of controlling undesirable bacteria and algae growth is given which provides for contacting the infested area or area to be protected with an effective amount of tetracyanodithiadiene having the structural formula:

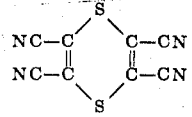

3 Claims, No Drawings

TETRACYANODITHIADIENE AND ITS SALTS AS BACTERICIDES AND ALGICIDES

This invention relates to the control of certain microorganism groups.

Bacteria, algae, and fungi represent far different and broad micro-organism groups and the susceptibility of one of these groups to toxic compounds does not generally indicate susceptibility of the others. This invention is particularly directed to a novel method for controlling bacteria and algae which can be effectively used in both agricultural and industrial environments.

The presence of bacteria and algae in water systems and on various substrates in commercial, industrial, and agricultural environments is an acute problem. This is particularly true in industrial systems containing process water which is fresh, slightly saline or concentrated brine which because of the source, storage, or utilization operates as a culture media for algae and bacteria. Typical of these industrial areas are paper mills, power systems, metalurgical operations, and oil production systems. Even in residential swimming pools the culture growth problem is acute. In general any process water which remains quiescent or under reduced flow rate is subject to the growth of bacteria, particularly anaerobic bacteria, and algae if light is present.

The harmful effects of growth of these microbes, principally algae and bacteria, are enormous. In oil production, for example, the microbes cause injection well plugging and corrosion of pipes and equipment necessitating frequent shutdown for cleaning. Here the sulfate-reducing bacteria are anaerobic because they thrive in the absence of free oxygen, and are described as "sulfate-reducing" since their life metabolism reduces sulfate ions found in most water to hydrogen sulfide. Moreover, these bacteria are resistant, or develop resistance, to many bacteriostatic and bactericidal agents. Frequently, these bacteria multiply so rapidly that the effective concentration of known bactericides becomes so high as to cause damage to equipment and other harmful effects. These sulfate-reducing bacteria generally includes the species of *Desulfovibrio desulfuricans*, and *Clostridium nigrificans*.

Saline water, commonly employed in primary and secondary oil recovery systems, is particularly effected by sulfate-reducing bacteria. The water itself, however, greatly limits the choice of bactericidal agents since many biocides such as amines, quaternary compounds, and imidazolines precipitate out in salt solutions. Other compounds such as those containing silver and mercury, such as phenylmercuriacetate, for example, are precipitated by the sulfides resulting from the metabolism of the bacteria.

In addition to the above environments, many inorganic and organic substrates are subject to fouling by algae and bacteria. These microbes disfigure leather and paper goods. The surfaces of plastic articles are damaged by growth, and additionally these microbes cause spoilage of package goods, particularly goods packaged in plastic, wood and other cellulosics such as paper, cardboard, and the like. Likewise bacterial pathogens are a problem in various agricultural situations.

Accordingly, a class of antimicrobial agents has been discovered which when applied to various inorganic and organic substrates such as those described above and others, or when incorporated into industrial process water or other water systems, such as swimming pools, prevents the infestation of algae and bacteria, and if such microbes are present, kills or prevents further growth of said microbes. As a consequence of the use of this invention, infested media shows evidence of marked improvement in stability and freedom from deterioration.

The novel method found for controlling bacteria and algae is the use of an effective amount of tetracyanodithiadiene which has the following structural formula:

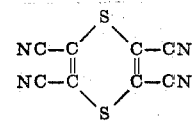

Tetracyanodithiadiene is also known as 1,4-dithia-2,3,5,6-tetracyanocyclohexa-2,5-diene and tetracyano-1,4-dithiin.

Tetracyanodithiadiene may be prepared in accordance with the teachings of U.S. Pat. No. 3,265,565. An alkali metal salt of 1,2-dimercaptomaleonitrile having the formula:

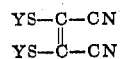

wherein Y is an alkali metal is brought into contact and reacts with a halide having a strong electron-attracting moiety which is attached directly to the halogen atom, such as CNCl, Cl$_3$CSCl, MeSO$_2$Cl and the like, recovering the resulting tetracyanodithiadiene.

One method of manufacture of the compound used in this invention adds cyanogen chloride to a cooled solution of the disodium salt of 1,2-dimercaptomaleonitrile in water. A precipitate is formed which is filtered and dried. Upon recrystallization from dioxane, the pale yellow tetracyanodithiadiene powder is recovered. The reaction may be carried out with very desirable results in the presence of water or other inert media such as benzene. Temperatures in the range of 20°C. to 150°C. may be employed.

Although we have described one process for producing the tetracyanodithiadiene which is employed in our invention, it should be understood that tetracyanodithiadiene produced by any method will be equally effective in our invention.

The antimicrobial compounds employing tetracyanodithiadiene of the invention not only provide the advantage of effectiveness when used in small quantities, but are also inexpensive and relatively easy to prepare.

The amount of tetracyanodithiadiene needed for effective control of organisms in process water or any other aqueous environment will depend entirely on the particular system. However, effective amounts are generally employed low and have been found to be on the order of 5–10 parts per million based upon the material to be protected.

The compounds of the invention may be added directly to process waters in any suitable tank. However, since the volumes of water to be protected are large compared to the maximum concentrations used, mixing is desirable. Direct addition, though simple, is not usually wholly satisfactory. Accordingly, the most useful mode of addition is to prepare a relatively smaller but more concentrated solution of the tetracyanodithiadiene than the final dilution desired. This solution can then be metered by a proportioning pump or its equivalent into a suitable agitated tank or into a flow of water as the latter is being pumped to the point of use. Normal turbulant flow in the conduit produces adequate mixing. In this way, accurate dosages can be supplied and uniform dilutions obtained.

If desired, any of the numerous well known inert diluents or additives may be employed with the novel antimicrobial agent provided that they are compatible therewith. Suitable dispersions may be prepared by dissolving up to about twenty percent by weight of tetracyanodithiadiene based on the weight of the inert additive in a water miscible solvent such as, for example, lower alkanols, ethylene glycol, monomethyl ether, dioxane, and the like. A water immiscible solvent may likewise be used including hydrocarbon solvents, such as ben-zene or xylene, halogenated hydrocarbons, such as chlorobenzene, chloroform, fluorotrichloromethane, dichlorodifluoromethane, and the like. An emulsifier may be employed and if desired a surfactant may be added including sodium lauryl sulfate, aliphatic and aromatic sulfates, such as sulfonated castor oil, or various alkly aryl sulfonates, such as the sodium salt of monosulfonated nonyl naphtalene. Non-ionic types of emulsifying agent, such as the higher molecular weight alkyl polyglycol ethers and analogous thioethers such as the decyl, dodecyl, and tetradecylpolyglycol ethers and the thioethers containing from 25 to 75 carbon atoms may be used. The concentrations of surfactant in the final emulsion should be sufficient to make the oil and water phases readily dispersable. Usually from 1 to 15 parts by weight of the surfactant per 100 parts of the formulation is a satisfactory range although such proportion may be varied over a wide range depending upon the circumstances.

Adjuvants such as wetting agents or humectants may, if desired, be employed particularly when compounding an aqueous dispersion. Examples of humectants are glycenol, diethylene glycol, polyethyleneglycol and the like.

Tetracyanodithiadiene is particularly effective at concentrations less than about ten parts per million against growth of bacteria of the genera of Bacilius, Aerobactor, Pseudomonas, and Desulfovibrio, and algae of the genera Chlorella, Oscillatoria, Ankistrodesmus, Chlamydomonas and Phormidium.

In keeping paper mill water systems free from bacteria and algae, concentrations of ten parts per million or less may be employed. The same amount will protect cooling towers and heat exchange equipment carrying aqueous fluids from microbial growth of various origins which left unchecked will cause corrosion, plugging, and consequent loss of cooling capacity in the system. Addition of 0.005 percent of the compound to coating materials, adhesive compositions sizes, glues, caulking compounds, latex emulsions, starch solutions, and polymer systems such as polyacrylamide solutions will prevent discoloration and decomposition of these materials by microbial degredation.

Quantities of the order of fifteen parts per million or less of the compounds when added to oil well brines and the like will effectively control microbial growth which otherwise will cause plugging of pipelines and corrosion of production equipment. A quantity on the same order added to drilling muds will protect the starches and gums contained therein from algal and bacterial attack, particularly by sulfate reducing bacteria of the desulfovibrio type, thus preventing corrosion and failure in oil well casings.

The use of quantities on the order of 50 parts per million or less in the washing or spraying solution employed for treating packing fruits and vegetables will drastically reduce the number of bacteria present and improve the keeping quantity and storage life of the product.

In the field of plastic manufacture, addition of an amount of the order of 0.2 percent or less of the total composition will render the finished product algae resistant and thus prevent deterioration or disfigurement of the molded product such as shower curtains, bath mats and the like. Self sanitizing paper, for example, disposable diapers, are particularly benefited by the invention since when applied in a suitable solvent, the tetracyanodithiadiene penetrates the substrate rather than merely coating the surface as in prior art applications. Moreover, treatment of wood with the compound of the instant composition by spraying or soaking will retard subsequent rot of the wood evidenced by discoloration and weakness thereof. Further the inclusion of amounts of 20 parts per million or less in cutting oils has been found to prevent spoilage and offensive odors in the liquid and improvement therein.

Tetracyanodithiadiene is particularly effective against algal growths of all species wherever they occur. For example, it is an effective auxiliary with chlorine in swimming pools where "black" algae thrives. This algal species is resistant to the minimum levels of chlorine generally permitted by public health regulations. Moreover, since algae are food for bacteria, control of algae by the use of the tetracyanodithiadiene of this invention prevents even the beginning of bacterial infestation although it is effective against preexisting bacteria as already described.

Formulations containing tetracyanodithiadiene may be applied in the form of a liquid by spraying the article or substance to be treated, or as a vapor by fumigation in those cases where it is practical. Often tetracyanodithiadiene may be applied by metering liquid formulations into a turbulant flow region of a stream of infested water. In still other cases it may be applied in the solid state by dusting or other means. In situations where tetracyanodithiadiene is to be incorporated into a product or where it is added to a composition to preserve it from deterioration, it may be simply added to the formulation prior to final mixing.

In the case of solid carriers, those which are favored for their large surface are such as bentonite, kieselfuhr, fullers earth, clay, pyrophylete, talc and the like may be employed. Commercial carriers are generally acceptable as are nonclay carriers, like lignocellulose, wood flour and such. When solid compositions are employed, it is desirable that the composition be in finely divided form. Preferably, the dust containing the active ingredients should be sufficiently fine that substantially all the particles will pass thru a U. S. standard sieve series No. 200 screen. The range of proportions of inert carrier or diluent to the active ingredient is broad and is not considered to be critical. From about 1 percent to 50 percent by weight of the active ingredients has been found adequate for the preparation of most dispersions. In dry compositions, up to about 10 percent active ingredient is suitable for most applications. It should be understood, of course, that the active ingredient may be employed by itself or in mixtures with other active materials if it is desired to disperse by aerosol or like means.

Another interesting application of the compound of this invention relates to the manufacture of antimicrobial paper. This method contemplates the use of tetracyanodithiadiene as a micro-organism inhibiting agent with the fiber structure of the paper. It may be introduced to the pulp slurry or stock solution prior to the formation of the sheet and will remain more or less a permanent part of the fiber structure evenly distributed throughout.

The following examples further illustrate the invention but are not limitive thereof except as indicated by the appended claims. All parts and percentage are by weight unless otherwise specified.

EXAMPLE 1

The efficacy of the compound of the present invention for controlling pathogenic bacteria is demonstrated in the following example utilizing a modified broth culture technique, with the test organisms exposed to an aqueous "solution" of the test chemical for 24 hours prior to adding dextrose-peptone broth. This allows measurement of antibacterial activity in the absence of a broth that could interfere with a chemical's activity. The assay bacteria are:

A = *Aerobacter aerogenes*
  *A. aerogenes* (Gram −) is used by the Paper Institute to evaluate slime control agents for paper mills. It is a common inhabitant of soils and water.
B = *Bacillus cereus*
C = *Escherichia coli*
D = *Pseudomonas aeruginosa*
E = *Staphylococcus aureus*
  *S. aureus* (Gram +) is a standard assay organism for rating bactericides. It is common on the skins of man and animals and certain strains are pathogenic.
F = *Xanthomonas vesicatoria*
  *X. vesicatoria* (Gram −) is the pathogen that incites bacteriosis of tomatoes and peppers.

Three test tubes are required for each compound in the first stage of bactericide evaluation. Nine ml. of deionized water is pipetted into each tube with the Filamatic, and the tubes are capped and sterilized. For each test compound, 1 ml. of the stock solution is pipetted into each tube, resulting in a test concentration of 100 ppm. One drop of a bacterial cell suspension is then added to the appropriate tubes. The bacterial cell suspensions are from 24-hour broth (0.1 percent dextrose − 1.0 percent peptone) cultures that were inoculated with bacteria from 7-day Nutrient Agar slants. After an exposure period of 24 hours, 1 ml. of 1 percent dextrose-10 percent peptone broth is pipetted aseptically into each tube. The tubes are then incubated for 24 hours at 37°C. and then presence or absence of growth is determined by turbidity readings. Tubes with no bacterial growth are subcultured to determine if the bacteria have been killed. Data are recorded as follows: 9 = kill; 5 = stasis and 0 = no apparent effect.

Priority for further testing is given to those chemicals that inhibit or kill more than one test species. In these tests at 5 ppm. the compound p-dithiintetracarbonitrile gave complete kill of organisms A, C, D, E and F referred to above and stasis of B.

EXAMPLE 2

The bactericidal activity of tetracyanodithiadiene is further tested against various bacteria in liquid media. The bacteria tested include:

A. *Aerobacter aerogenes*
B. *Bacillus cereus*
C. *Pseudomonas aeruginosa*.

The test is a broth dilution test wherein appropriate aliquotes of suitable dilutions of tetracyanodithiadiene are placed in test tubes with 5 milliliters of nutrient broth and additional water to yield a graded series of concentrations. Each tube has a total volume of 10 milliliters. The broth was inoculated with 2.0 ml/l of 20-hour culture of the test bacteria. The tubes were incubated at 30°C. for 24 hours and then observed for the presence of turbidity which indicates growth of the test organism. The most dilute solution of tetracyanodithiadiene showing no growth was considered the minimal inhibitory concentration. The results appear in Table I.

EXAMPLE 3

Example 2 is repeated using the anaerobic bacteria species, *Desulfovibrio desulfuricans*. The test procedure is identical excepting that the tubes are incubated at 37°C. for 21 days. They are then observed for growth which is indicated by the blackening of the medium with enaerobs. The minimal inhibitory concentration is shown in Table I.

EXAMPLE 4

The bactericidal activity of tetracyanodithiadiene was further tested against the following bacteria:

A. *Escherichia coli*
B. *Staphylococcus aureus*
C. *Xanthomonas vesicatoria*
D. *Clostridium species*.

This test employs a solid medium and consists of placing appropriate aliquotes of suitable silutions of tetracyanodithiadiene in sterile petri plates to yield desired concentrations after adding 15 milliliters of melted agar. The plates are agitated while the agar is fluid to provide suitable mixing of the toxicant with agar. After solidification the plates are inoculated with 20-hour broth suspension of the given bacterial species and incubated for 44 to 48 hours at 30°C. At the end of incubation the plates were observed for the minimal inhibitory concentration which is recorded in Table I.

EXAMPLE 5

The algicidal activity of tetracyanodithiadiene is tested against various algae in liquid medium. The algae tested include:

A. *Ankistrodesmus sp.*
B. *Chlorella sp.*
C. *Chlamydomonas sp.*
D. *Oscillatoria sp.*
E. *Phormidium sp.*

The test is similar to that used in Example 2 except that Chu's medium is used and the tests are set up in 250 milliliter Erlenmeyer flasks with each flask having a final volume of 100 milliliters. Each flask is inoculated with 1.0 milliliter of actively growing culture of algae. In the case of the free-flowing specie of *Chlorella*, the final concentration of cells is not less thant 300,000 organisms per milliliter. The test flasks are incubated at room temperature in front of a window having a northern exposure until the control flasks showed moderately heavy growth. The flasks are observed and the minimal inhibitory concentration is recorded in Table II.

TABLE I

| BACTERIA | Minimal Inhibitory Concentration in ppm. |
|---|---|
| Aerobacter aerogenes | 5.0 |
| Bacillus cereus | 5.0 |
| Pseudomonas aeruginosa | 5.0 |
| Desulfovibrio desulfuricans | 5.0 |
| Escherichia coli | 5.0 |
| Staphylococcus aureus | 5.0 |
| Xanthomonus vesicatoria | 5.0 |
| Clostridium sp. | 10.0 |

TABLE II

| ALGAE | Minimal Inhibitory Concentration in ppm. |
|---|---|
| Ankistrodesmus sp. | 6.4 |
| Chlorella sp. | 3.2 |
| Chlamydomonas sp. | 3.2 |
| Oscillatoria sp. | 3.2 |
| Phormidium sp. | 6.4 |

We claim:
1. The method of inhibiting undesirable algae in an aqueous environment comprising
    contacting the algae growth environment with an effective amount of tetracyanodithiadiene.
2. The method according to claim 1 wherein tetracyanodithiadiene is applied at a rate from about 5 ppm to about 50 ppm.
3. The method according to claim 2 wherein tetracyanodithiadiene is applied at a rate from about 5 ppm to about 10 ppm.

* * * * *